(12) United States Patent
Wackerly

(10) Patent No.: US 9,152,522 B2
(45) Date of Patent: Oct. 6, 2015

(54) METHODS FOR CONFIGURATION MANAGEMENT USING A FALLBACK CONFIGURATION

(75) Inventor: Shaun Wackerly, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1037 days.

(21) Appl. No.: 12/910,629

(22) Filed: Oct. 22, 2010

(65) Prior Publication Data

US 2012/0102166 A1    Apr. 26, 2012

(51) Int. Cl.
*G06F 15/177* (2006.01)
*G06F 11/30* (2006.01)
*H04L 12/24* (2006.01)

(52) U.S. Cl.
CPC ........ *G06F 11/3006* (2013.01); *G06F 11/3051* (2013.01); *G06F 11/3055* (2013.01); *H04L 41/082* (2013.01); *H04L 41/0863* (2013.01); *H04L 41/0866* (2013.01)

(58) Field of Classification Search
CPC .............. H04L 41/0866; H04L 41/082; H04L 41/0863; H04L 41/0803; H04L 41/08; H04L 41/0859; H04L 41/085
USPC ................................ 709/220, 221, 222; 714/2
See application file for complete search history.

(56) References Cited

U.S. PATENT DOCUMENTS

| | | | |
|---|---|---|---|
| 6,374,352 B1 | 4/2002 | Goldman et al. | |
| 6,931,523 B1 | 8/2005 | Tomoson et al. | |
| 7,673,175 B2 | 3/2010 | Mora et al. | |
| 7,739,727 B2 * | 6/2010 | Syvanne | 726/11 |
| 2008/0037528 A1 * | 2/2008 | Lindeijer et al. | 370/354 |
| 2008/0109568 A1 * | 5/2008 | Rengarajan et al. | 710/19 |
| 2011/0055636 A1 * | 3/2011 | DeHaan et al. | 714/37 |
| 2012/0072551 A1 * | 3/2012 | Ali et al. | 709/220 |

FOREIGN PATENT DOCUMENTS

| | | |
|---|---|---|
| CN | 1904846 | 1/2007 |
| WO | WO-20090152855 | 12/2009 |

* cited by examiner

*Primary Examiner* — Liangche A Wang
*Assistant Examiner* — Cheikh Ndiaye
(74) *Attorney, Agent, or Firm* — Hewlett-Packard Patent Department

(57) ABSTRACT

A method of configuring a network managed device in a network is described herein. A fallback configuration is determined. The fallback configuration is identified as a configuration that enables the network managed device to be manageable. A working configuration is determined. The working configuration is described by a working set of configuration data that has been updated based on a management command. A commit command is received. The working configuration is saved as a running configuration and verification of the running configuration is initiated. It is determined whether the verification of the running configuration is successful. Where it is not successful, the running configuration is saved as a failed configuration and the running configuration is replaced with the fallback configuration.

12 Claims, 6 Drawing Sheets

ID:METHODS FOR CONFIGURATION
MANAGEMENT USING A FALLBACK
CONFIGURATION

I. BACKGROUND

In conventional network computing environments, a number of devices are used to interconnect computing systems to efficiently transfer data over the network. In large-scale implementations, hundreds or thousands of devices are deployed to interconnect the computing systems.

Specialized computer systems such as network management systems are dedicated to controlling and monitoring the status of network managed devices, such as network infrastructure devices, hosts, printers, and other interconnected computing systems. However, changes in configurations, initiated by the network management system, may produce unexpected results, such as making a network managed device unreachable. Where such a result occurs, the configuration of the network managed device may be incapable of being corrected via typical methods performed by the network management system.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Figure 1:
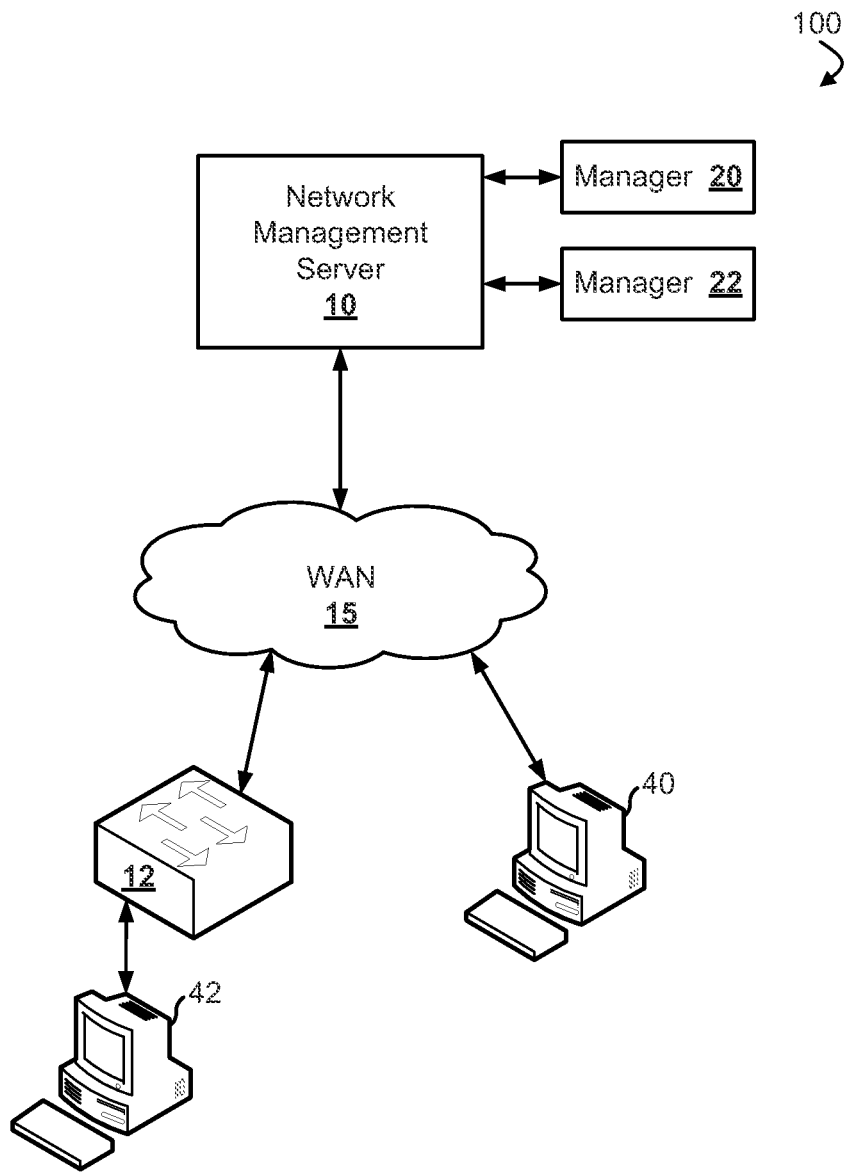
FIG. 1 is topological block diagram of a network system in accordance with an embodiment of the invention.

A network management system is used to administer and monitor a network, such as a local area network (LAN), a wide area network (WAN), etc. Network management systems typically include one or more network management servers (NMS), which provide the central control of network managed devices connected to the network. As used herein, a network managed device is a computing device that is enabled to be controlled through a network connection by an NMS. Examples of network managed devices include network infrastructure devices (e.g., routers, switches, access points, etc.), personal computers, laptops, printers, hosts, or other hardware equipment in the network that are addressable and manageable by an NMS.

Changes to a configuration of a network managed device may be made through a network connection by an NMS. As used herein, a configuration may be described by configuration data which is applied to the network. Configuration data includes any settings or instructions that affect the operation of the network managed device. Examples of such configuration data may include, but is not limited to, port memberships of a virtual LAN (VLAN), security-related bindings such as those contained in an access control list (ACL), Media Access Control (MAC) addressing, Internet Protocol (IP) addressing, routing, anti-spoofing, network address translation, Virtual Private Network (VPN) definitions, rules specifying link speed or mode of a network card, communication and/or security protocols, keys, passwords, bandwidth usage and allocation, number or type of devices communicating with the network device, interface settings, next-hop router, etc.

As understood by those skilled in the art, network managed devices, such as network switches and routers, may maintain two configuration files: a running configuration and a startup configuration. As used herein, a running configuration is a configuration that is used by a network managed device to make operational decisions. A startup configuration allows the device to communicate on the network after boot. Typical network managed devices may also implement a working configuration, which is a working set of configuration data that have not been committed to the running configuration.

In many instances, when changes to the running configuration of a network managed device are committed, there is a risk that the connectivity will be lost between the NMS and the network managed device. As described herein, when devices are managed using a network connection and a configuration of that device is no longer valid (e.g., device is not reachable and/or manageable via that connection by the NMS), the network managed device reverts back to a fallback configuration. A fallback configuration is a configuration that is known, with reasonable certainty, or identified as a configuration that enables the device to be reachable from and/or manageable by the manager. The fallback configuration may be maintained in a separate configuration file, and stored in the non-volatile memory of the network managed device. Furthermore, a manager is a management device or address that is identified as the approved method of managing the device. The manager also verifies management applications are able to reach the device and/or is able to be managed.

A method of configuring a network managed device in a network is described herein. The network managed device is under the control of a network management server in the network. A fallback configuration is determined. The fallback configuration is identified as a configuration that enables the network managed device to be manageable. A working configuration is determined. The working configuration is described by a working set of configuration data that has been updated based on a management command. A commit command is received. The working configuration is saved as a running configuration and verification of the running configuration is initiated. It is determined whether the verification of the running configuration is successful. Where it is not successful, the running configuration is saved as a failed configuration and the running configuration is replaced with the fallback configuration.

FIG. 1 is topological block diagram of a network system 100 in accordance with an embodiment of the invention. System 100 includes managers 20-22, a network management server (NMS) 10, a wide area network (WAN) 15, a host 42, and a plurality of network managed devices, such as, a network switch 12, and a host 40.

Managers 20-22 are operatively coupled to network management server 10. Managers 20-22 are configured to control any one or more of network managed devices in the network 100 via NMS 10, and to verify that a management application is able to reach a network managed device that is under its purview and control. One or more managers, such as managers 20-22, may assert management and control over any one or more network managed device in network 100. A manager may be for example, a network administrator, and modifications to a configuration may be made through a command line interface, simple network management protocol (SNMP) instruction, a remote monitoring (RMON) action, an applet, or other configuration management command for interfacing with the network management device via NMS 10. Also, the manager may be an automated process which dynamically determines configurations and configuration management commands for a network managed device. Managers 20-22 are shown as standalone devices. In another embodiment, one or both of managers 20-22 are integrated into another device in network 100, such as NMS 10.

Network management server 10 is operatively coupled to managers 20-22, and network switch 12 and host 40 via WAN 15. The connection between NMS 10 and managers 20-22 may include multiple network segments, transmission technologies and components. Likewise, the connection between network management server 10 and network switch 12 and host 40 may include multiple network segments, transmission technologies and components. Network management server 10 is configured to manage, monitor, and/or deploy a network. In one embodiment, NMS 10 is configured to manage and control network managed devices based on configuration commands received from one or more of managers 20-22. In particular, NMS 10 may generate and transmit a packet (e.g., IP packet) which includes a command about the configuration of a targeted network managed device. The command may be a management command, a commit, etc.

Host 42 is operatively coupled to network switch 12. Network switch 12 is operatively coupled to network management server 10 via WAN 15. Network switch 12 is configured to process and transfer data in a network. Host 40 is operatively coupled to network management server 10 via WAN 15. Additionally, network switch 12 and host 40 are network managed devices that are under the purview and control of NMS 10 and one or more of managers 20-22.

In one embodiment, network switch 12 and host 40 are configured to determine a fallback configuration, verify a running configuration, and revert to the fallback configuration where the running configuration is determined to be invalid. As previously described, a running configuration is a configuration that is used by a network managed device to make operational decisions.

In operation, at least one of managers 20-22 issues a configuration command to NMS 10. Network management server 10 may transmit a packet including the configuration command to a targeted network managed device, e.g., network switch 12 and/or host 40. The configuration data as described in the command may be effectuated on the targeted network managed device. As a result of the command, the targeted network managed device (e.g., network switch 12 and/or host 40) determines that a running configuration is invalid, and as such, replaces the running configuration with a previously-determined fallback configuration. By making the fallback configuration the new running configuration, reachability of the targeted network managed device may be restored on the network. This may be accomplished without the use of specialized hardware, such as an out-of-band management port.

The present invention can also be applied in other network topologies and environments. Network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2A:
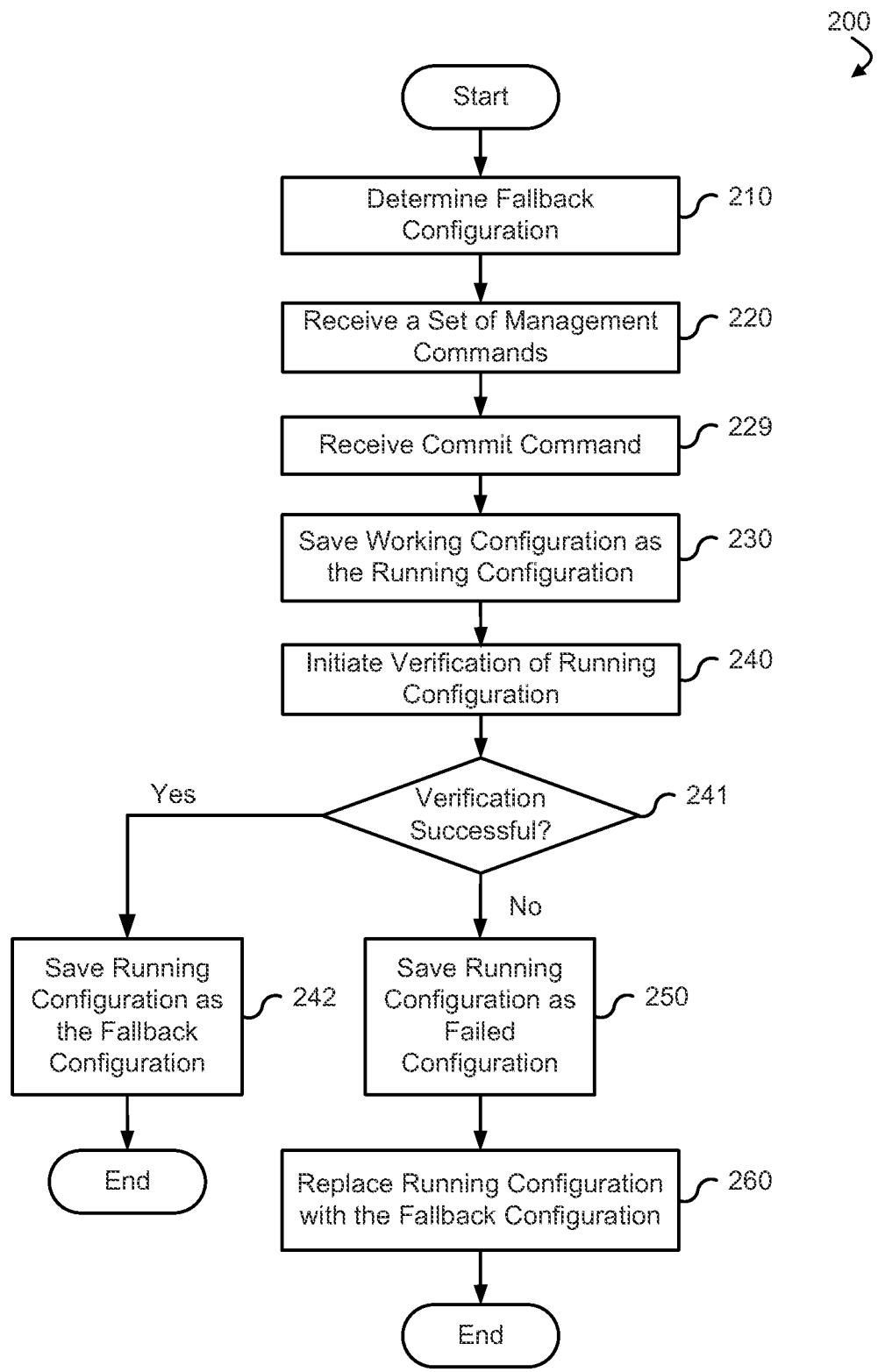
FIG. 2A is a process flow diagram for configuration management in accordance with an embodiment of the invention.

FIG. 2A is a process flow diagram for configuration management in accordance with an embodiment of the invention. The depicted process flow 200 is carried out by execution of one or more sequences of executable instructions. In another embodiment, the process flow 200 is carried out by execution of components of a network managed device, an arrangement of hardware logic, e.g., an Application-Specific Integrated Circuit (ASIC), etc.

In a network having one or more network managed devices under common management and control, the network managed device may revert to a fallback configuration, for example where a running configuration of that device is no longer valid.

Typically, network managed devices include a startup configuration described by a startup set of configuration data. In one embodiment, the startup configuration is stored in the non-volatile memory of the network managed device. A boot sequence is initiated using the startup configuration. Upon completion of a boot sequence, the startup configuration is saved and used as the running configuration and is stored, for example in volatile memory of the network managed device. As previously described, a running configuration is a configuration that is used by a network managed device to make operational decisions. After saving the startup configuration as the running configuration, the running configuration is described by the startup set of configuration data.

At step 210, a fallback configuration is determined. As previously described, a fallback configuration is a configuration that is known, with reasonable certainty, to enable the device to be reachable from and/or manageable by the manager. In one embodiment, verification is attempted for the running configuration with respect to reachability and/or manageability (e.g., security considerations, etc.). Those skilled in the art would readily appreciate that various known verification techniques may be used. For example, either self-verification or external verification methodologies may be implemented.

If verification is successful, the running configuration is saved as the fallback configuration. The running configuration may be either copied immediately to the fallback configuration, or the running configuration may be marked "good" and copied just prior to being overwritten, for example, by a working configuration that is then committed. Determination of the fallback configuration is described in further detail with respect to FIG. 3.

After some amount of time, at step 220, a set of management commands is received. As used herein, a management command is a command that causes a configuration to be changed (e.g., modified, erased, overridden, etc.). For example, management commands may enable new features, modify addressing according to a new network layout, etc.

The set of management commands are issued by a manager and is included in a network packet that is transmitted from a network management server. A copy of the running configuration is saved as a working configuration. As previously described, a working configuration is a working set of configuration data that have not been committed to the running configuration. The changes stemming from the management command(s) may be reflected in the working configuration.

In other words, the working set of configuration data is updated based on the management commands received.

A commit command is received, at step 229. As used herein, a commit command is a command that causes any changes (e.g., modifications, erasures, overrides, etc.) reflected in the working configuration to be saved to the running configuration. In one embodiment, the commit command is issued by a manager and is included in a network packet that is transmitted from a network management server.

At step 230, the working configuration is saved as the running configuration. Configuration changes may be made to the running configuration in volatile memory of the network managed device. At this point, the working configuration matches the running configuration.

Changes to a configuration can cause unexpected results in the associated network managed device. Often, mis-configurations occur at the fault of the manager. For example, the changes may render the network managed device unreachable from and/or unmanageable by the NMS: Should this occur, corrective configuration commands issued by a manager of the network managed device may not be received by the network managed device, and thus could be ineffective. As described herein, a network managed device may engage in a self-correction process by which verification is attempted, and a fallback configuration replaces a running configuration, where verification fails.

At step 240, a verification of the running configuration is initiated. In one embodiment, a verification technique for reachability and/or security considerations is applied to the running configuration. Various known verification techniques may be used. For example, a simple Ping utility or request-response verification may be performed. Other, more complex verification may also be implemented. At step 241, it is determined whether verification is successful. If verification is successful, the running configuration, which includes the changes from step 220, is saved as the fallback configuration at step 242.

If, however, verification is not successful after a predetermined number of failed attempts or a set amount of time, the running configuration is saved as a failed configuration at step 250. As used herein, a failed configuration is a copy of a configuration that became active and subsequently failed verification for reachability by manager(s) of the network managed device. The copy may be maintained in a separate configuration file, and stored in non-volatile memory of the network managed device. In one embodiment, the failed configuration is retained, for example, if the manager (e.g., network administrator) wanted to correct the error remotely and re-commit the configuration to be active.

At step 260, the running configuration is replaced with the fallback configuration. In other words, the fallback configuration is saved as the running configuration, for example, in volatile memory of the network managed device. Since the fallback configuration is known to enable the network managed device to be reachable and/or manageable, using this configuration provides a self-correcting technique by which an unreachable and/or unmanageable network managed device is restored on the network.

The maximum time at which a network managed device is unreachable and/or unmanageable is tied to the number of failed verification attempts, for example at step 241, or set amount of time that was preconfigured, for example by a network administrator. After that associated amount of time has passed, the network managed device is either verified as having a manageable and valid configuration or the network managed device automatically reverts to the fallback configuration, which is a known valid configuration. This alleviates the network administrator from physically locating the device in order to revert to a valid configuration.

In one embodiment, the detection of an event, such as determining that verification failed or replacing the running configuration with the fallback configuration, may trigger a remedial action to be performed. For example, the remedial action may be a logging and/or notification action.

The triggering event itself may be logged, for example in the device, and/or a report message may be generated and provided to a network management server and/or a manager for further action, for example upon detection of the triggering event. The report message may be pushed or otherwise initiated by the network managed device upon detection of the event. In one embodiment, the report message may be sent using a file transfer protocol (FTP), trivial file transfer protocol (TFTP), secure file transfer protocol (SFTP), SNMP, or some other transfer protocol. The report message may include information about the triggering event, configuration modification(s), and the like. For isolated or small configuration changes, the report message may be a SNMP message. The message may include the failed configuration file or any portion thereof.

Figure 2B:
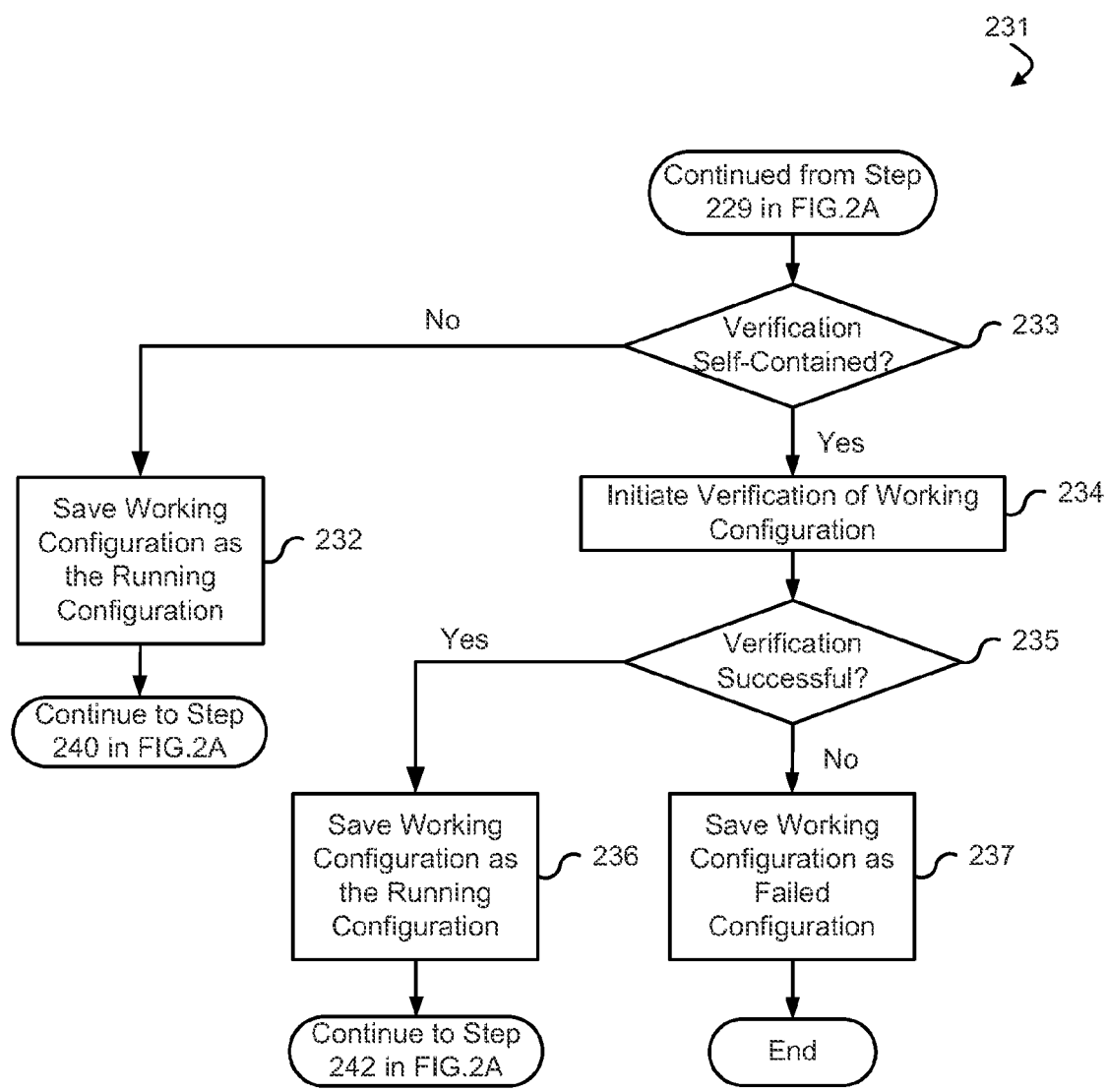
FIG. 2B is a process flow diagram for static verification in accordance with an embodiment of the invention.

FIG. 2B is a process flow diagram for static verification in accordance with an embodiment of the invention. The depicted process flow 231 is carried out by execution of one or more sequences of executable instructions. In another embodiment, the process flow 231 is carried out by execution of components of a network managed device, an arrangement of hardware logic, e.g., an Application-Specific Integrated Circuit (ASIC), etc. In one embodiment, process flow 231 may be carried out after a commit command is received, for example at step 229 of FIG. 2A.

In a network having one or more network managed devices under common management and control, a working configuration of a network managed device may be verified before it becomes an active, running configuration. In particular, static verification (i.e., verification that does not involve actual operation of the device) may be performed.

A commit command may have been received earlier, for example at step 229 of FIG. 2A. At step 233, it is determined whether the verification is self-contained (i.e., static in nature). For example, verification could ensure that at least one IP address was configured on the network managed device. Such verification could be performed without actually operating the device, and as such, accomplished statically.

If the verification is not self-contained, the working configuration is saved as the running configuration, at step 232, and processing then continues to step 240 in FIG. 2A. On the other hand, if the verification is self-contained, static verification of the working configuration is initiated, at step 234. Those skilled in the art would readily appreciate that various known static verification techniques may be used. For example, either self-verification or external verification methodologies may be implemented.

At step 235, it is determined whether the static verification is successful. If successful, the working configuration is saved as the running configuration, at step 236, and processing continues to step 242 of FIG. 2A, where the running configuration is saved as the fallback configuration. Otherwise, the working configuration is saved as the failed configuration, at step 237.

Figure 3:
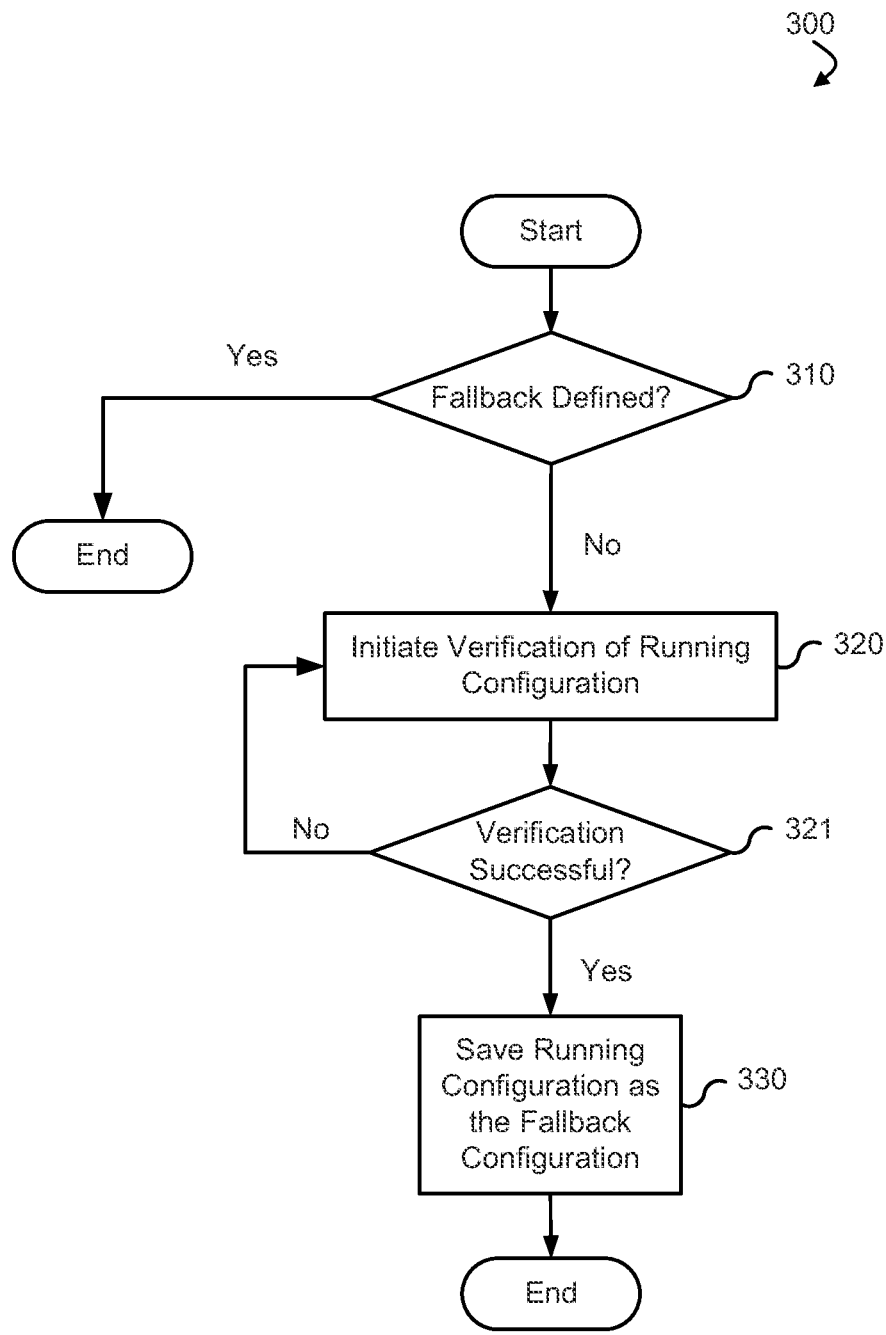
FIG. 3 is a process flow diagram for determining a fallback configuration in accordance with an embodiment of the invention.

FIG. 3 is a process flow diagram for determining a fallback configuration in accordance with an embodiment of the invention. The depicted process flow 300 is carried out by execution of one or more sequences of executable instructions. In another embodiment, the process flow 300 is carried out by execution of components of a network managed device, an arrangement of hardware logic, e.g., an Application-Specific Integrated Circuit (ASIC), etc. In one embodiment, process flow 300 describes in further detail the process of determining a fallback configuration as initially recited at step 210 of FIG. 2A.

In a network having one or more network managed devices under common management and control, a fallback configuration for the network managed device may be determined. As previously described, network managed devices include a startup configuration, which is used as the running configuration upon completion of a boot sequence in the network managed device.

At step 310, it is determined whether a fallback configuration has been defined and saved to a non-volatile memory of the network managed device. If already defined, processing at flow 300 ends but may be continued to step 220 of FIG. 2A. Otherwise, a fallback configuration remains to be determined, and processing continues to step 320, where a verification of the running configuration is initiated. Where verification is determined to be unsuccessful at step 321, processing continues back to step 320, whereby verification is periodically initiated again.

In some instances, verification may be found to be unsuccessful multiple times, leading to repeated loop back to step 320. Where this condition is observed, the manager may attempt to take corrective measures by providing a new configuration which is saved as the running configuration, for example on the network managed device. The new configuration is designed by the manager to be successful during the verification process, thereby thwarting further loop backs.

If verification is determined to be successful at step 321, it may be deemed with reasonable certainty that the network managed device is reachable from and/or manageable by the manager. As such, the running configuration is saved as the fallback configuration at step 330, processing at flow 300 ends but may be continued to step 220 of FIG. 2A.

Figure 4:
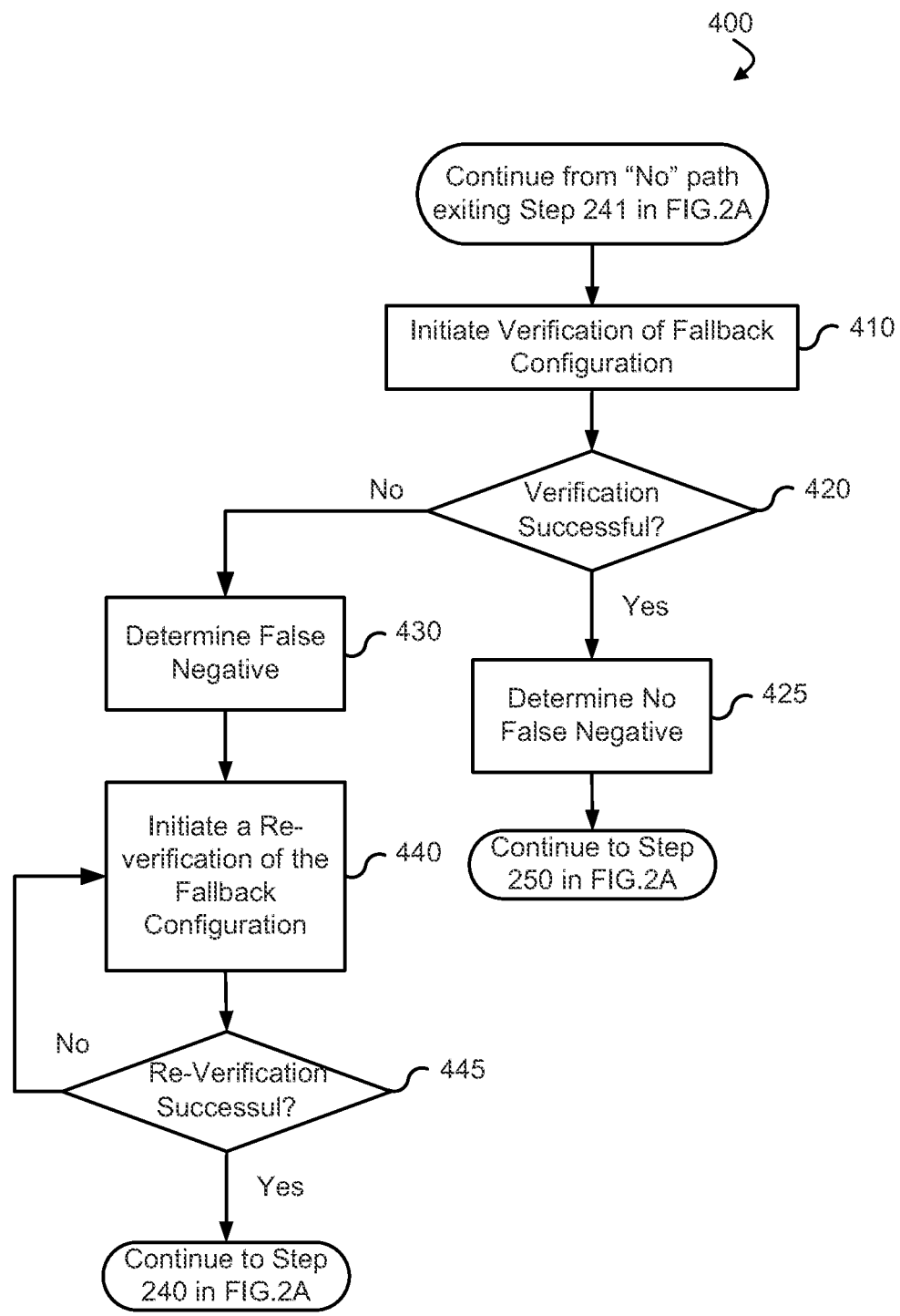
FIG. 4 is a process flow diagram for determining a false indication of an unsuccessful verification in accordance with an embodiment of the invention.

FIG. 4 is a process flow diagram for determining a false indication of an unsuccessful verification in accordance with an embodiment of the invention. The depicted process flow 400 is carried out by execution of one or more sequences of executable instructions. In another embodiment, the process flow 400 is carried out by execution of components of a network managed device, an arrangement of hardware logic, e.g., an Application-Specific Integrated Circuit (ASIC), etc.

In one embodiment, process flow 400 may be carried out after a verification of a running configuration is determined to be unsuccessful, for example along the "no" path exiting step 241 of FIG. 2A. If the running configuration was verified at a time where the network was experiencing independent issues, it is possible that those network issues impacted the verification process. In other words, the running configuration would appear to have failed verification, when in fact, it could be valid. Disruptions in the network may have caused the verification process to give a false indication of the unsuccessful verification, i.e., a false negative.

To detect the false negative, a verification of a fallback configuration is initiated at step 410. By definition, the fallback configuration is known or identified as being a valid configuration, by which the network managed device is reachable from and/or manageable by a manager. At step 420, it is determined whether verification of the fallback configuration is successful. Since the fallback configuration is assumed to be a valid configuration (or it was a valid configuration at an earlier point in time), the expectation is that it would be found to be a valid configuration at a current time.

If verification is successful, no false negative is determined at step 425, and the verification result, that indicated that the running configuration is not successful (for example from step 241 in FIG. 2A), may be trusted. Processing then continues to step 250 of FIG. 2A where the running configuration is saved as the failed configuration.

If verification is not successful, it can be deducted that there is a disruption in the network, and the verification result should not be trusted. As such, at step 430, it can be presumed that the verification result (unsuccessful) from step 420 is a false negative.

After detecting the false negative condition, re-verification of the fallback configuration is initiated, at step 440, and is repeated until the network disruption has been resolved. In particular, at step 445, it is determined whether the re-verification is successful. If successful, the network disruption is deemed to be resolved because the fallback configuration, which is known as being valid, is found to be valid. At this point, the network is free of disruptions, and processing continues to step 240 of FIG. 2A, where verification of the running configuration may be initiated again.

If unsuccessful, processing loops back to step 440, and re-verification of the fallback configuration is performed repeatedly until the network issue is deemed to be resolved.

Figure 5:
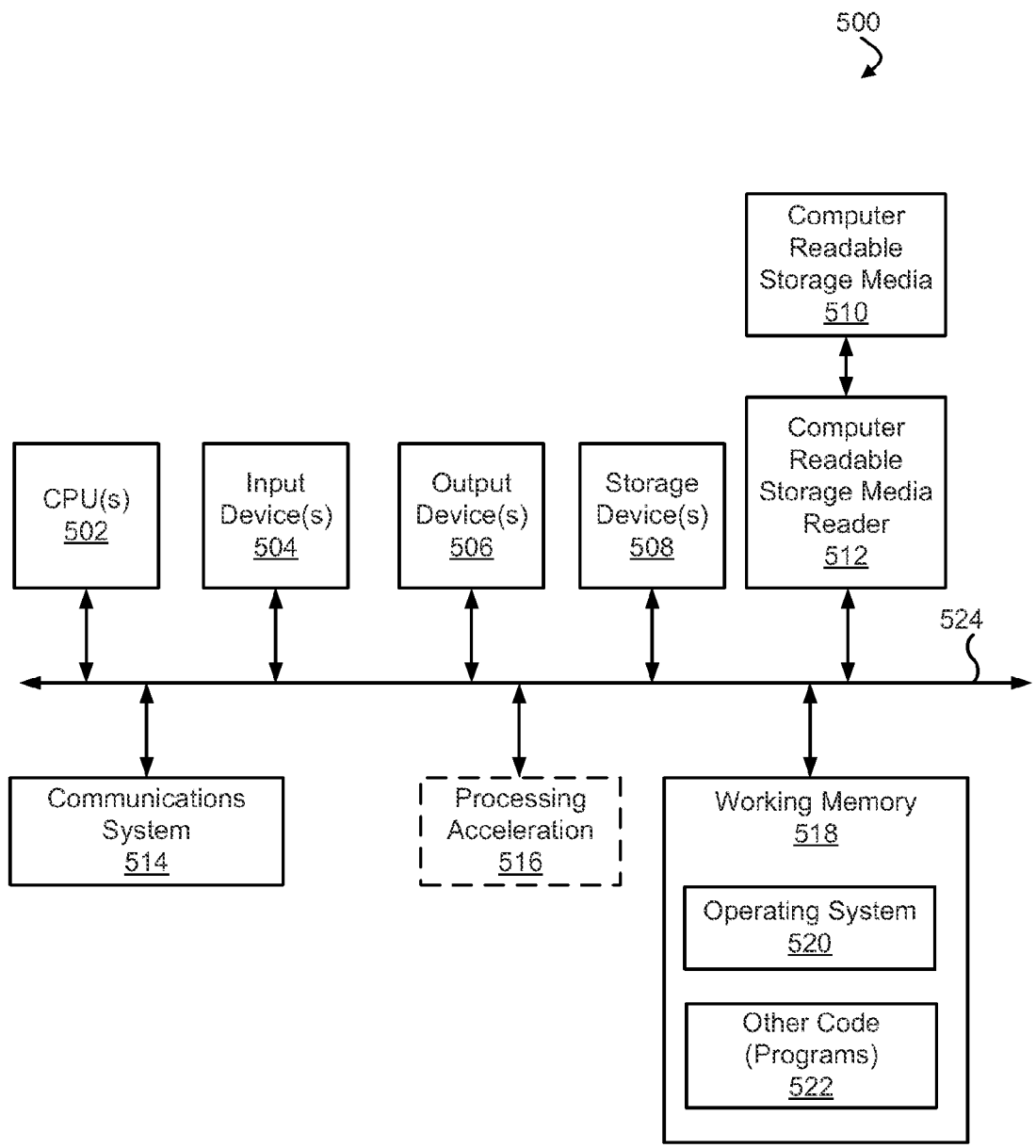
FIG. 5 illustrates a computer system in accordance with an embodiment of the invention.

FIG. 5 illustrates a computer system in accordance with an embodiment of the invention. The system 500 may be used to implement any of the computer systems described above. The computer system 500 is shown comprising hardware elements that may be electrically coupled via a bus 524. The hardware elements may include one or more central processing units (CPUs) 502, one or more input devices 504 (e.g., a mouse, a keyboard, etc.), and one or more output devices 506 (e.g., a display device, a printer, etc.). The computer system 500 may also include one or more storage devices 508. By way of example, the storage device(s) 508 can include devices such as disk drives, optical storage devices, solid-state storage device such as a random access memory ("RAM") and/or a read-only memory ("ROM"), which can be programmable, flash-updateable and/or the like.

The computer system 500 may additionally include a computer-readable storage media reader 512, a communications system 514 (e.g., a modem, a network card (wireless or wired), an infra-red communication device, etc.), and working memory 518, which may include RAM and ROM devices as described above. In some embodiments, the computer system 500 may also include a processing acceleration unit 516, which can include a digital signal processor (DSP), a special-purpose processor, and/or the like.

The computer-readable storage media reader 512 can further be connected to a computer-readable storage medium 510, together (and in combination with storage device(s) 508 in one embodiment) comprehensively representing remote, local, fixed, and/or removable storage devices plus storage media for temporarily and/or more permanently containing, storing, transmitting, and retrieving computer-readable information. The communications system 514 may permit data to be exchanged with the network and/or any other computer described above with respect to the system 500.

The computer system 500 may also comprise software elements, shown as being currently located within a working memory 518, including an operating system 520 and/or other code 522, such as an application program (which may be a client application, Web browser, mid-tier application, RDBMS, etc.). It should be appreciated that alternate embodiments of a computer system 500 may have numerous variations from that described above. For example, customized hardware might also be used and/or particular elements might be implemented in hardware, software (including portable software, such as applets), or both. Further, connection to other computing devices such as network input/output devices may be employed.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A method of configuring a network managed device in a network, the network managed device under the control of a network management server in the network, the method comprising:
    determining a fallback configuration that is identified as a configuration that enables the network managed device to be manageable;
    determining a working configuration described by a working set of configuration data updated based on a management command received from the network management server;
    saving the working configuration as a running configuration;
    initiating a verification of the running configuration;
    determining whether the verification of the running configuration is successful;
    where the verification of the running configuration is unsuccessful, using the fallback configuration to determine whether the unsuccessful verification of the running configuration is a false indication, by;
    determining whether a verification of the fallback configuration is successful;
    if the verification of the fallback configuration is unsuccessful, determining that the unsuccessful verification of the running configuration is a false indication; and
    if the verification of the fallback configuration is successful, determining that the unsuccessful verification of the running configuration is not a false indication;
    in response to a determination that the unsuccessful verification of the running configuration is not a false indication, saving the running configuration as a failed configuration; and
    replacing, by the network managed device, the running configuration with the fallback configuration.

2. The method of claim 1, further comprising:
    saving the running configuration as the fallback configuration where the verification of the running configuration is successful.

3. The method of claim 1, wherein determining a fallback configuration comprises:
    initiating a boot sequence on the network managed device using a startup configuration, the startup configuration described by a startup set of configuration data; and
    saving the startup configuration as the running configuration.

4. The method of claim 3, wherein determining a fallback configuration further comprises:
    initiating a verification of the running configuration, wherein the running configuration is described by a startup set of configuration data;
    determining whether the verification of the running configuration is successful; and
    saving the running configuration described by the startup set of configuration data as the fallback configuration, where verification of the running configuration is successful.

5. The method of claim 1, wherein the fallback configuration is maintained in a first configuration file, and wherein the failed configuration is maintained in a second configuration file.

6. The method of claim 1, further comprising:
    generating a report message upon detection of a triggering event, wherein the triggering event includes detection of an unsuccessful verification of the running configuration.

7. The method of claim 6, wherein the report message includes information about the triggering event.

8. A method of configuring a network managed device in a network, the network managed device under the control of a network management server in the network, the method comprising:
    determining a fallback configuration that is identified as a configuration that enables the network managed device to be manageable;
    determining a working configuration described by a working set of configuration data updated based on a management command received from the network management server;
    determining whether a verification of the working configuration is self-contained;
    in response to a determination that the verification of the working configuration is not self-contained,
    saving the working configuration as a running configuration;
    initiating a verification of the running configuration;
    determining whether the verification of the running configuration is successful;
    in response to a determination that the verification of the running configuration is unsuccessful, using the fallback configuration to determine whether the unsuccessful verification of the running configuration is a false indication, by;
    determining whether a verification of the fallback configuration is successful;
    if the verification of the fallback configuration is unsuccessful, determining that the unsuccessful verification of the running configuration is a false indication; and
    if the verification of the fallback configuration is successful, determining that the unsuccessful verification of the running configuration is not a false indication;
    in response to a determination that the unsuccessful verification of the running configuration is not a false indication, saving the running configuration as a failed configuration; and replacing, by the network managed device, the running configuration with the fallback configuration.

9. The method of claim 8, further comprising:

in response to a determination that the verification of the working configuration is self-contained,
  initiating a verification of the working configuration;
  determining whether the verification of the working configuration is successful;
  saving the working configuration as a failed configuration, where verification of the working configuration is not successful; and
  saving the working configuration as the running configuration, where verification of the working configuration is successful.

10. The method of claim 8, further comprising:

saving the working configuration as the running configuration, where the verification of the working configuration is not self-contained.

11. A non-transitory computer-readable medium storing a plurality of instructions for controlling a data processor to configure a network managed device in a network, wherein the instructions, when executed by data processor, are to cause the data processor to:

determine a fallback configuration that is identified as a configuration that enables the network managed device to be manageable;

determine a working configuration described by a working set of configuration data updated based on a received management command;

save the working configuration as a running configuration;

initiate a verification of the running configuration;

determine whether the verification of the running configuration is successful;

in response to a determination that the verification of the running configuration is unsuccessful, use the fallback configuration to determine whether the unsuccessful verification of the running configuration is a false indication, wherein to use the fallback configuration, the data processor is to:

determine whether a verification of the fallback configuration is successful;

if the verification of the fallback configuration is unsuccessful, determine that the unsuccessful verification of the running configuration is a false indication; and if the verification of the fallback configuration is successful, determine that the unsuccessful verification of the running configuration is not a false indication;

in response to a determination that the unsuccessful verification of the running configuration is not a false indication, save the running configuration as a failed configuration; and replace the running configuration with the fallback configuration.

12. The non-transitory computer-readable medium of claim 11, wherein the instructions are further to cause the data processor to save the running configuration as the fallback configuration where the verification of the running configuration is successful.

* * * * *